United States Patent [19]
Sullivan

[11] 3,910,259
[45] Oct. 7, 1975

[54] SYSTEM AND METHOD FOR DETERMINING FETAL HEART RATE

[75] Inventor: John William Sullivan, Los Altos, Calif.

[73] Assignee: Gould Inc., Chicago, Ill.

[22] Filed: Nov. 23, 1973

[21] Appl. No.: 418,438

[52] U.S. Cl. ................... 128/2.05 T; 128/2.05 Z
[51] Int. Cl.² ........................................... A61B 5/02
[58] Field of Search .......... 128/2 V, 2.05 R, 2.05 T, 128/2.05 Z, 2.06 A, 2.06 F, 2.06 R, 419 P, 422; 73/67.7, 67.9

[56] References Cited
UNITED STATES PATENTS

| | | | |
|---|---|---|---|
| 3,171,892 | 3/1965 | Pantle | 128/2.05 R |
| 3,554,188 | 1/1971 | Lasch et al. | 128/2.06 F |
| 3,613,670 | 10/1971 | Edenhofer | 128/2.06 F |
| 3,669,120 | 6/1972 | Nielsen | 128/419 P |
| 3,731,672 | 5/1973 | McIntosh | 128/2.06 A |
| 3,763,851 | 10/1973 | Haff et al. | 128/2.05 Z |
| 3,780,725 | 12/1973 | Goldberg | 128/2.05 T |
| 3,802,253 | 4/1974 | Lee | 128/2 V |

*Primary Examiner*—William E. Kamm
*Attorney, Agent, or Firm*—Flehr, Hohbach, Test, Albritton & Herbert

[57] ABSTRACT

System and method for determining fetal heart rate in which a demodulated Doppler signal is passed through a sharply tuned filter to eliminate Doppler components corresponding to heart movement other than the heartbeat. The filtered signal is applied to a comparator which causes a one-shot multivibrator to fire and deliver an output pulse in response to each heartbeat signal. The output pulses are applied to a beat-to-beat counter which produces an analog voltage corresponding to the rate of the pulses. This voltage is utilized to control the period of the multivibrator to prevent false pulses and double counting in response to harmonics of the heartbeat signal.

11 Claims, 3 Drawing Figures

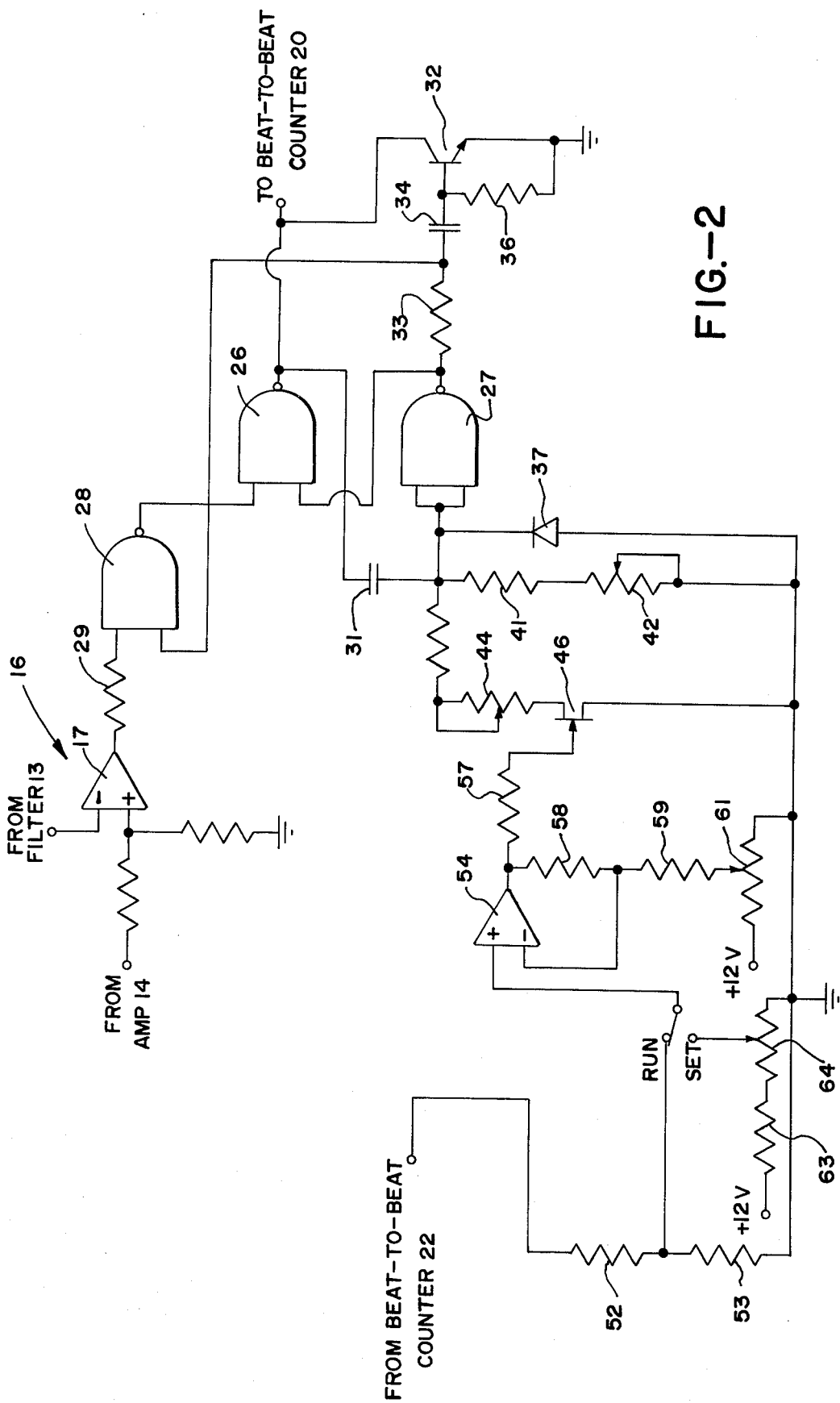

SYSTEM AND METHOD FOR DETERMINING FETAL HEART RATE

BACKGROUND OF THE INVENTION

This invention pertains generally to instruments for monitoring fetal heartbeats and more particularly to a system and method for processing Doppler signals containing fetal heart rate information.

Over the years doctors have come to realize that the state of a fetus can be determined from the fetal heart rate. In the past fetal heart rate has generally been determined with a fetalscope. In recent years, the correlation between fetal heart rate and the abdominal contraction cycle of the mother during labor has been found to be of significance in diagnosing fetal distress. In order to correlate the fetal heart rate with the contraction cycle, a doctor needs to know when the peak of the contraction cycle occurs and he needs to know the fetal heart rate before, during and after the peak occurs. Because it takes approximately one minute to determine the fetal heart rate with a fetalscope, it is difficult to correlate heart rate information determined in this manner with the contraction cycle which becomes increasingly shorter as delivery approaches.

Recently, systems utilizing ultrasonic energy and the Doppler principle have been provided for monitoring the fetal heartbeat. In such systems, a transducer passes an ultrasonic beam into the uterus of the expectant mother where it is reflected back to the transducer. Because of the Doppler effect, the frequency of the reflected beam differs from that of the transmitted beam by an amount corresponding to the rate of fetal heart movement. Such systems permit the fetal heart rate to be monitored on a beat-by-beat basis, and this information would seem to be well suited for correlation with the contraction cycle.

However, it has been found that the beat-by-beat information can be quite misleading. Even though the heart is beating at a consistent, steady rate, the Doppler signal may change from beat to beat due to other motion of the heart. For example, if the heart is rotating at the same time it is going through a peak contraction, the Doppler signal will undergo a phase change, and the beat-to-beat detector will interpret the phase change as an indication of an increase or decrease in the heart rate when, in fact, the rate has not changed at all. The problem is further complicated because, even though the heart rate may remain constant, the rhythm is constantly changing, and the Doppler signal can contain frequency components corresponding to the change in rhythm which will obscure the heartbeat component of the signal. In addition, harmonics of the heart rate signal can give rise to spurious counts and multiple counting of the heartbeats.

SUMMARY AND OBJECTS OF THE INVENTION

Although the Doppler signal changes quite rapidly from beat to beat, it has been observed that when averaged over a suitable period of time the Doppler signal does correspond to the true fetal heart rate. In the system and method of the invention, a demodulated Doppler signal is passed through a sharply tuned filter to eliminate Doppler components corresponding to heart movement other than the heartbeat. The filtered signal is applied to a comparator which causes a one-shot multivibrator to fire and deliver an output pulse in response to each heartbeat signal. The output pulses are applied to a beat-to-beat counter which produces an analog voltage corresponding to the rate of the pulses. This voltage is utilized to control the period of the multivibrator to prevent false pulses and double counting in response to harmonics of the heartbeat signal.

It is in general an object of the invention to provide a new and improved system and method for processing Doppler signals containing fetal heart rate information.

Another object of the invention is to provide a system and method of the above character which provide more accurate and reliable information about fetal heart rate than beat-by-beat techniques heretofore provided.

Another object of the invention is to provide a system and method of the above character in which heart movements other than heartbeats do not affect the determination of the heart rate.

Another object of the invention is to provide a system and method of the above character in which harmonics of a heart rate signal do not give rise to false counts and multiple counting.

Additional objects and features of the invention will be apparent from the following description in which the preferred embodiments are set forth in detail in conjunction with the accompanying drawings.

BRIEF DESCRIPTION OF THE DRAWINGS

FIG. 2 is a circuit diagram of the comparator and controlled one-shot multivibrator portions of the embodiment shown in FIG. 1.

DESCRIPTION OF THE PREFERRED EMBODIMENTS

Figure 1:
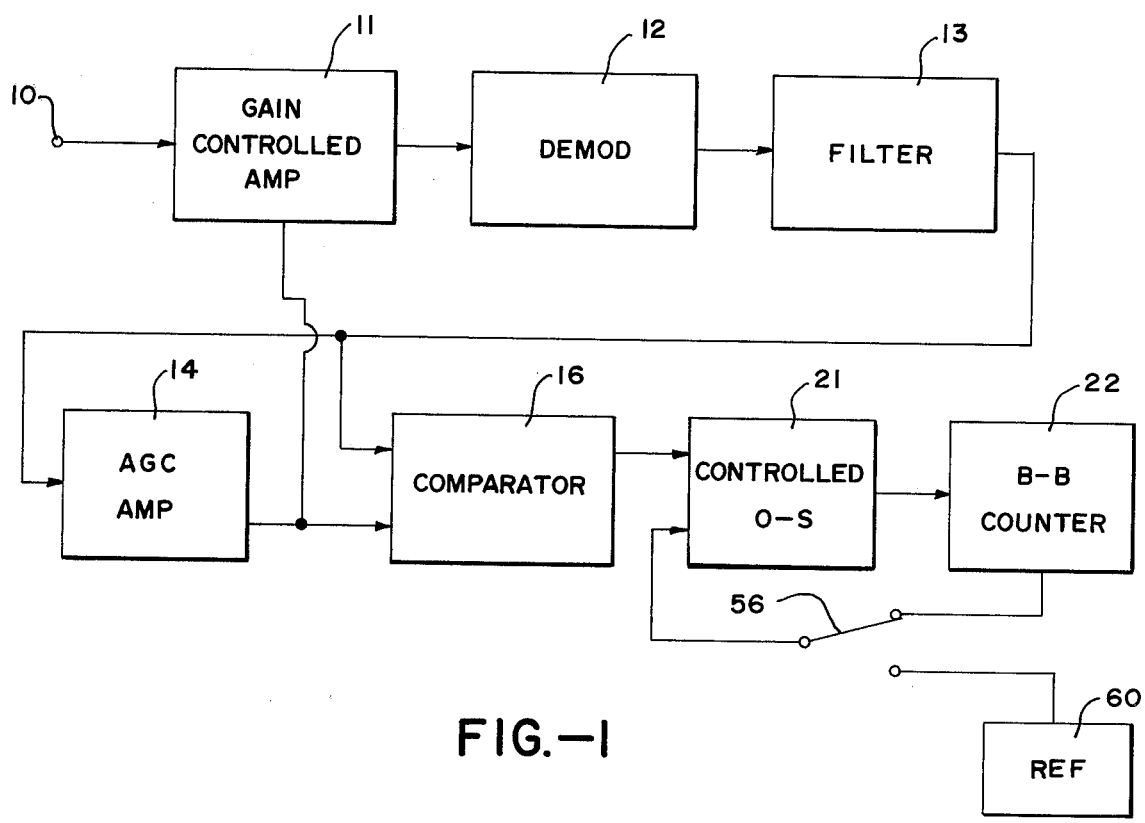
FIG. 1 is a block diagram of one embodiment of a system for determining the rate of fetal heartbeat according to the invention.

As illustrated in FIG. 1, the system includes an input terminal 10 through which Doppler signals which vary in frequency according to the movement of a fetal heart can be applied. These signals are typically provided by a suitable receiving transducer placed on the mother's outer abdominal wall. One suitable transducer is disclosed in application Ser. No. 120,970, filed Mar. 4, 1971, now U.S. Pat. No. 3,780,725.

Signals received at input terminal 10 are applied to the input of a gain controlled amplifier 11. This amplifier can be of a suitable known design, and in the preferred embodiment it provides a substantially uniform output on the order of 4 to 5 volts for input signals ranging from about 60 mv to about 6 volts. The upper frequency response of amplifier 11 is preferably limited to about 500 Hz.

The output of amplifier 11 is connected to the input of a demodulator 12. In the preferred embodiment, the demodulator is a full-wave rectifier, and the output of this stage contains Doppler frequencies in the range of 100 to 500 Hz. This signal looks very much like an audio modulated signal, and it must be further demodulated or rectified to obtain the pulse amplitude information in the fetal heart signal.

Each fetal heart pulse is a complex multi-pulse phenomenon containing frequency components from 1 Hz to well beyond 20 Hz. This multi-pulse phenomenon may be considered the background rhythm to the main fetal pulse, and even though the fetal pulse period may remain constant, this rhythm constantly changes. Because of the rhythmical changes, it is difficult to detect a main pulse and identify it as the fetal heart rate. However, it is known that the fetal heart rate lies in the range of 30 to 200 beats per minute (bpm), which is equivalent to a frequency range of 0.5 Hz to 3.3 Hz. It has been found that the complex signal can be reduced to a signal similar to a sine wave having a frequency corresponding to the heart rate by passing it through a sharply tuned filter.

Accordingly, the output of demodulator 12 is connected to the input of a low pass filter 13. In the preferred embodiment, this filter is a 5-pole Butterworth filter having a 3 db roll-off point at 3.5 Hz and an ultimate slope of 30 db per octave.

The output of filter 13 is connected to the input of an amplifier 14 which amplifies and filters the signal from filter 13 to provide a relatively smooth dc voltage which varies a few decibels with changes in the level of the Doppler input signal. The output of amplifier 14 is connected to the control input of amplifier 11, and the dc voltage developed by amplifier 14 serves as an AGC voltage which controls the gain of amplifier 11.

The output of filter 13 is also connected to one input of a comparator 16. In the preferred embodiment, th comparator comprises a differential amplifier 17, and the output of the filter is applied to the negative or inverting input of this amplifier. The output of amplifier 14 is applied to the positive or non-inverting input of amplifier 17 through a voltage divider consisting of resistors 18 and 19. Thus, the AGC control voltage developed by amplifier 14 also serves as a reference voltage for the comparator. It will be noted that the comparator is an inverting type, i.e. its output is negative for input signals which are positive relative to the reference signal and positive for signals which are negative with respect to the reference. This comparator is particularly well adapted for detecting the pause period between heartbeats, and this period has been found to be the most distinctive portion of the heart pulse waveform.

The output of comparator 16 is connected to the input of a one-shot multivibrator 21 which delivers an output pulse to a beat-to-beat counter 22 in response to each heartbeat detected by comparator 16. The beat-to-beat counter produces an output voltage having a magnitude corresponding to the rate of the pulses delivered to it by the multivibrator. As is discussed more fully hereinafter, this output voltage is utilized to control the period of the multivibrator to prevent the delivery of spurious output pulses and multiple counting in response to harmonics of the heartbeat signals.

As discussed above, low pass filer 13 has a cutoff frequency of 3.5 Hz in order to accommodate the full range of fetal heart signals, the maximum being on the order of 200 bpm or 3.3 Hz. If, for example, the actual fetal heart rate being detected is 60 bpm, or 1 Hz, the output of the filter will most likely include second and third harmonics at 2 and 3 Hz in addition to the desired 1 Hz signal. If counted, these harmonics would give an erroneous heart rate indication of 120 or 180 bpm.

In order to prevent the delivery of output pulses in response to the harmonics of the heart rate signal which fall within the pass band of filter 13, multivibrator 21 is held in its unstable state for a predetermined portion of the interval between successive output pulses. In the preferred embodiment, the period of the multivibrator, i.e. the time it remains in its unstable state, is on the order of 0.8 of the interval between the pulses.

As illustrated in FIG. 2, multivibrator 21 includes a pair of NAND gates 26 and 27. The output of comparator 16 is connected to one input of NAND gate 26 through an additional NAND gate 28. The output of comparator amplifier 17 is connected to one input of gate 28 through a resistor 29, and the output of gate 28 is connected to one input of NAND gate 26. The other input of NAND gate 26 is connected to the output of NAND gate 27, and the output of NAND gate 26 is connected to the beat-to-beat counter. The inputs of NAND gate 27 are connected together, and a capacitor 31 is connected between the output of NAND gate 26 and the inputs of NAND gate 27. The output of NAND gate 27 is connected to the base of an NPN transistor 32 through a resistor 33 and a capacitor 34. The collector of the transistor is connected to the output of NAND gate 26, and the emitter is grounded. The junction of resistor 33 and capacitor 34 is connected to the second input of NAND gate 28, and a resistor 36 is connected between the base and emitter of transistor 32. A diode 37 is connected between the inputs of NAND gate 27 and ground.

Capacitor 31 forms a part of a timing circuit which determines the period of multivibrator 21, i.e. the length of time the multivibrator remains in its unstable state after being fired. The timing circuit also includes a first resistive branch consisting of a fixed resistor 41 and a variable resistor 42 connected between the inputs of NAND gate 27 and ground. The timing circuit also includes a second resistive branch connected in parallel with the first branch. The second branch includes a fixed resistor 43, a variable resistor 44, and a field effect transistor (FET) 46 which serves as a voltage controlled resistive element. As is discussed more fully hereinafter, the variable resistance provided by the FET permits the period of the multivibrator to vary with the heart rate so that the multivibrator remains in its unstable state for a predetermined portion of the varying interval between successive output pulses.

A control voltage for FET 46 is derived from the output pulses from multivibrator 21. As indicated above, beat-to-beat counter 22 produces an output voltage having a magnitude dependent upon the pulse rate, and in the preferred embodiment the output voltage is a linear function of the pulse rate. This voltage is reduced in magnitude by a voltage divider consisting of resistors 52 and 53 and applied to the positive or non-inverting input of a differential amplifier 54 through a switch 56. The output of this amplifier is applied to the gate of FET 46 through a resistor 57, and this voltage is a linear function of the output pulse rate. A reference voltage for amplifier 54 and a biasing voltage for the FET are provided by a +12 V. source and a voltage divider consisting of fixed resistors 58 and 59 and a variable resistor 61.

Switch 56 has a RUN position in which the positive input of amplifier 54 is connected to the output of beat-to-beat counter 22 and a SET position in which the amplifier input is connected to a reference source 62. This source consists of a +12 volt source and a voltage divider comprising a fixed resistor 63 and a variable resistor 64. Resistor 64 is adjusted by a knob which is calibrated in units of heart rate, e.g. bpm.

Figure 3:
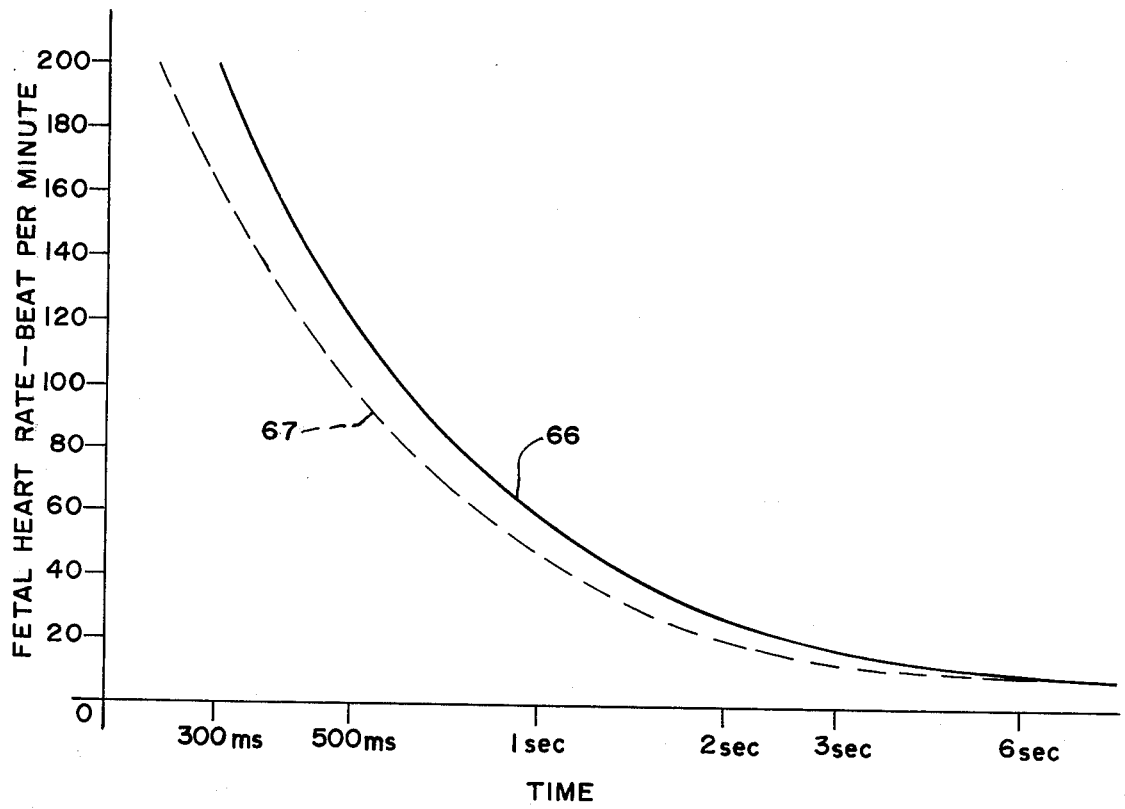
FIG. 3 is a graphical representation of the relationship between the heart rate, the heart rate period and the voltage which controls the period of the one-shot multivibrator of the embodiment of FIG. 1.

Referring now to FIG. 3, time is plotted on a logarithmic scale along one axis, and heart rate is plotted on a linear scale along a second axis. Curve 66 is a plot of the period of heart rates ranging from 10 bpm to 200 bpm. Curve 67 represents 80% of the heart rate period. This curve is also non-linear, and it indicates that the resistance in the timing circuit of the multivibrator should vary in a non-linear manner with respect to the heart rate to maintain the period of the multivibrator a fixed portion of the heart rate period. The FET serves this function, and variable resistors 42, 44 and 61 permit the timing circuit to be adjusted so that the period of the multivibrator will follow the desired curve.

In adjusting the timing circuit to track the desired curve, variable resistor 61 is set to apply the maximum voltage to the gate of the FET so that the gate voltage will be in excess of its pinch-off voltage, in effect open-circuiting the FET. Resistor 42 is then adjusted to provide a 3 second time period for the one-shot multivibrator. Resistor 61 is then adjusted to provide a gate voltage of O V., which is the minimum impedance point for the FET, and resistor 44 is then adjusted for a multivibrator time period of 240 ms. Finally, switch 56 is moved to the set position, and resistor 64 is adjusted to provide an input voltage to amplifier 44 corresponding to a heart rate of 100 beats per minute.

Operation and use of the system described above, and therein the method of the invention, can now be described. A Doppler signal which varies in frequency according to the rate of fetal heart movement is applied to input terminal 10. To initiate the operation of the system, switch 56 is placed in the SET position, and resistor 64 is adjusted to supply a voltage to amplifier 54 corresponding to the approximate heart rate to be detected. The period of multivibrator is adjusted automatically, and the system acquires the heart rate in approximately 10 seconds. As the output levels off, the switch is turned to the RUN position, and thereafter the system will automatically track the heart rate represented by the Doppler signal applied to input terminal 10.

The Doppler input signal is amplified to a predetermined level by amplifier 11 and demodulated by demodulator 12. Components outside the normal fetal heartbeat range of about 30 bpm to 200 bpm, or 0.5 Hz to 3.3 Hz are removed from the demodulated signal by filter 13. The signal at the output of the filter consists of a sine wave having a frequency corresponding to the fetal heart rate and any harmonics of the fetal heart signal which fall within the pass band of the filter.

When the filtered signal goes to a zero level, the output of comparator 16 goes high. If the second input to NAND gate 28 is high at this time, the output of the gate goes low, firing the multivibrator. When this happens, the multivibrator switches from its stable state to its unstable state, and the output of gate 26 becomes high, delivering an output pulse to beat-to-beat counter 22. As the output of NAND gate 26 becomes high, a positive voltage step is transmitted through capacitor 31 to the inputs of NAND gate 27, making the output of NAND gate 27 low and latching the multivibrator in its unstable state. Even though the zero level may disappear at the output of the filter, the multivibrator will remain in its unstable state until the signal at the inputs of NAND gate 27 drops to the low logic level due to the charging of capacitor 31 through resistors 41-44 and FET 46. When this transition point is reached, the output of NAND gate 27 becomes high, and if the output of NAND gate 28 is also high, the multivibrator will be reset, making the output of NAND gate 26 low.

The multivibrator cannot fire in response to harmonics of the heart rate signal because it is in its unstable state when the harmonics occur. In this state, the output of NAND gate 26 remains high regardless of the output states of the comparator and NAND gate 28, and the harmonics produce no spurious output pulses or multiple counting.

Next assume that the heart rate increases suddenly between beats, for example from 60 bpm to 80 bpm. At the 60 bpm rate, the multivibrator has been operating with a period of 800 ms, and the 80 bpm rate has a 750 ms time base period. This means that the first pulse at the 80 bpm rate will occur while the multivibrator is still in its unstable state. In this state, the output of NAND gate 27 is low, making the output of NAND gate 28 low. When the multivibrator is reset, the output of NAND gate 27 goes high, and this transition is applied to the second input of NAND gate 28 through resistor 33, capacitor 34 and the base-emitter circuit of transistor 32. At this time, the output of comparator 16 is high because of the first pulse at the new rate, and the output of NAND gate 28 immediately becomes low again, re-firing the multivibrator and delivering the desired output pulse to counter 22.

In the event that the initial heart rate is above 100 bpm, it may not be necessary to utilize run-set switch 56 to initiate the operation of the system. The multivibrator has a free running frequency somewhat higher than 200 bpm, and in the absence of an input signal, it operates at this rate. When an input signal is applied, comparator 16 begins to operate. Every time the comparator output is high, it inhibits the multivibrator from firing. As the multivibrator is inhibited, the effective time base increases, and the beat-to-beat counter output voltage starts to fall. It will continue to fall until it reaches a value corresponding to the input heart rate if this rate is greater than 100 bpm, at which point the system will come into synchronization and track automatically thereafter. If the initial heart rate is less than 100 bpm, however, the run-set switch should be used to initiate operation to assure that the system will not be synchronized erroneously with the second harmonic of the true heart rate signal. Synchronization with a harmonic would result in undesired multiple counting.

When multivibrator 21 is reset, the output of NAND gate 26 becomes low. At this time, capacitor 31 is still charged to the transitional voltage of NAND gate 27, and it applies a negative voltage to the inputs of this gate. This charge is quickly removed from the capacitor by diode 47 so that the multivibrator can be fired again almost instantaneously. A rapid discharge of the capacitor is further facilitated by transistor 32 which is turned on, grounding the end of the capacitor connected to the output of NAND gate 26 for a brief period after the output of NAND gate 27 goes high as the multivibrator is reset.

The invention has a number of important features and advantages. The fetal heart rate signal is effectively separated from signals produced by other heart movements, and harmonics of the heart rate signal cannot cause multiple counting, as they did in the fetal heart monitoring systems provided heretofore. The system adjusts itself to any change in the heart rate within a few seconds, and this adjustment is made smoothly to provide a stable output indication which can be interpreted readily.

It is apparent from the foregoing that a new and improved system and method for determining fetal heart rate has been provided. While only the presently preferred embodiments have been described, as will be apparent to those familiar with the art, certain changes and modifications can be made without departing from the scope of the invention as defined by the following claims.

I claim:

1. In a system for providing an output signal representative of the rate of a fetal heartbeat: means for receiving a Doppler signal which varies in frequency according to the rate of fetal heart movement, means for processing the Doppler signal to eliminate frequencies outside a predetermined range corresponding to an expected range of fetal heartbeats, said predetermined range including at least one higher frequency which is harmonically related to a lower frequency in the range, means responsive to the processed Doppler signal for delivering output pulses at a rate corresponding to the fetal heartbeat, and means responsive to the output pulses for conditioning the means for delivering such pulses not to deliver pulses in response to harmonics of the Doppler signal which may be present in the processed signal.

2. The system of claim 1 wherein the means for delivering output pulses includes a one-shot multivibrator adapted to switch to its unstable state in response to the processed Doppler signal and remain in said state for a period determined by a control signal from the means responsive to the output pulses.

3. The system of claim 2 wherein the means responsive to the output pulses provides a control signal for maintaining the multivibrator in its unstable state for a period on the order of 80 percent of the interval between successive ones of the output pulses.

4. The system of claim 2 wherein the multivibrator includes a timing circuit including a field effect transistor having a resistance determined by the control signal.

5. The system of claim 1 wherein the means for processing the Doppler signal includes a controlled gain amplifier for increasing the signal to a predetermined level, means for demodulating the amplified signal, and means for filtering the demodulated signal to eliminate frequencies higher than about 3.5 Hz.

6. In a method for determining the rate of a fetal heartbeat, the steps of monitoring a Doppler signal which varies in frequency at a rate corresponding to fetal heart movement, processing the Doppler signal to eliminate frequencies outside a predetermined range corresponding to an expected range of fetal heartbeats, said range including higher frequencies which are related harmonically to lower frequencies in the range, delivering output pulses in response to the processed Doppler signal, and preventing the delivery of output pulses in response to harmonics of the Doppler signal, whereby the output pulses delivered provide an accurate indication of the fetal heart rate.

7. The method of claim 6 wherein the delivery of output pulses in response to harmonics is prevented by the steps of monitoring the output pulses and preventing the delivery of such pulses for a period on the order of 80 per-cent of the interval between successive output pulses.

8. In a method for determining the rate of a fetal heartbeat, the steps of: receiving a Doppler signal which varies in frequency at a rate corresponding to the rate of fetal heart movement; processing the Doppler signal to eliminate frequencies outside a predetermined range corresponding to an expected range of fetal heartbeat, said range including higher frequencies which are harmonically related to lower frequencies in the range, switching a multivibrator from a first state to a second state in response to the processed Doppler signal to provide output pulses indicative of the fetal heart rate, monitoring the output pulses, and maintaining the multivibrator in its second state for a predetermined portion of the interval between successive output pulses to prevent the delivery of pulses in response to harmonics of the Doppler signal which may be present in the processed signal.

9. The method of claim 8 including the step of maintaining the multivibrator in its second state for a period on the order of 80 per cent of the interval between successive output pulses.

10. In a system for providing an output signal representative of the rate of a fetal heartbeat: means for receiving a Doppler signal which varies in frequency according to the rate of fetal heart movement, means for processing the Doppler signal to eliminate frequencies outside a predetermined range corresponding to an expected range of fetal heartbeats, said predetermined range including at least one higher frequency which is harmonically related to a lower frequency in the range, variable width pulse generating means for delivering output pulses in response to the processed Doppler signal, the duration of the output pulses being determined by a control signal applied to the pulse generating means, means responsive to the output pulses for applying a control signal to the pulse generating means to condition said pulse generating means to deliver output pulses having a duration corresponding to a predetermined portion of the interval between successive ones of the output pulses, and means for selectively applying a reference control signal to the pulse generating means to establish an initial pulse duration and initiate operation of the system at a predetermined rate.

11. In a method for providing an output signal representative of the rate of a fetal heartbeat, the steps of: receiving a Doppler signal which varies in frequency according to the rate of fetal heart movement, processing the Doppler signal to eliminate frequencies outside a predetermined range corresponding to an expected range of fetal heartbeats, said predetermined range including at least one higher frequency which is harmonically related to a lower frequency in the range, actuating variable width pulse generating means to deliver output pulses in response to the processed Doppler signal, the width of the output pulses being determined by a control signal applied to the pulse generating means, monitoring the output pulses, applying a control signal to the pulse generating means to condition said means to deliver output pulses having a width corresponding to a predetermined portion of the interval between successive ones of the output pulses, and selectively applying a reference control signal to the pulse generating means to establish an initial pulse width and initiate operation at a predetermined rate.

\* \* \* \* \*